United States Patent [19]

Suzuki

[11] 3,903,176

[45] *Sept. 2, 1975

[54] HYDROQUINONE PROCESS

[75] Inventor: Shigeto Suzuki, San Francisco, Calif.

[73] Assignee: Chevron Research Company, San Francisco, Calif.

[ * ] Notice: The portion of the term of this patent subsequent to Sept. 18, 1990, has been disclaimed.

[22] Filed: July 18, 1973

[21] Appl. No.: 380,412

Related U.S. Application Data

[63] Continuation-in-part of Ser. No. 11,309, Feb. 13, 1970, Pat. No. 3,760,009.

[52] U.S. Cl. ............................................. 260/621 R
[51] Int. Cl.² .......................................... C07C 29/00
[58] Field of Search ............, 260/515 A, 621 R, 629, 260/524 R

[56] References Cited
UNITED STATES PATENTS

| | | | |
|---|---|---|---|
| 1,737,842 | 12/1929 | Hale et al. | 260/621 R |
| 1,878,463 | 9/1932 | Britton | 260/515 A |
| 2,563,820 | 4/1951 | Barragh et al. | 260/515 A |
| 2,727,924 | 12/1955 | Pearlman | 260/621 R |
| 2,727,926 | 12/1955 | Kaeding et al. | 260/621 R |
| 2,852,567 | 9/1958 | Barnard et al. | 260/621 R |
| 2,999,879 | 9/1961 | Broich et al. | 260/515 A X |
| 3,075,008 | 1/1963 | Girard et al. | 260/515 A |
| 3,089,905 | 5/1963 | Wygand | 260/621 R |
| 3,760,008 | 9/1973 | Suzuki | 260/621 R |
| 3,760,009 | 9/1973 | Suzuki | 260/621 R |

*Primary Examiner*—Howard T. Mars
*Assistant Examiner*—Norman Morgenstern
*Attorney, Agent, or Firm*—G. F. Magdeburger; John Stoner, Jr.; T. G. DeJonghe

[57] ABSTRACT

Hydroquinone is produced from paraxylene by dichlorinating paraxylene, separating the 2,5-dichloroparaxylene derivative from the reaction product, oxidizing the 2,5-dichloroparaxylene to produce 2,5-dichloroterephthalic acid, reacting the acid with an alkali metal hydroxide forming the alkali metal salt, and heating the salt at an elevated temperature in the presence of a limited amount of water.

3 Claims, No Drawings

HYDROQUINONE PROCESS

CROSS REFERENCE TO RELATED APPLICATION

This application is a continuation-in-part of copending application Ser. No. 11,309, filed Feb. 13, 1970, now U.S. Pat. No. 3,760,009.

FIELD OF THE INVENTION

This invention relates to a novel process for the production of hydroquinone, particularly from alkali metal salts of 2,5-dichloroterephthalic acid, which are formed by chlorinating paraxylene and then oxidizing the 2,5-dichloroparaxylene product.

BACKGROUND OF THE INVENTION

Hydroquinone is a well-known article of commerce. Conventional methods for its production include the reduction of quinone and the catalyzed cyclodimerization of acetylene in the presence of carbon monoxide.

THE INVENTION

It has now been found that hydroquinone can be prepared by heating a mixture of an alkali metal salt of 2,5-dichloroterephthalic acid, alkali metal hydroxide and water at a temperature in the range from about 150°C. to 270°C., preferably 190°C. to 210°C. for a period in the range from about 0.2 to 2 hours, and acidifying the resulting reaction product mixture. Preferably the reaction is promoted by the presence of a copper catalyst in the reaction mixture. Surprisingly, the presence of water in the reaction mixture does not adversely affect the reaction, provided that the relative amount added is not too great. It appears, on a molecular basis, that the amount of water in the reaction mixture should not materially exceed the amount of the base and that the presence of a large relative amount of water operates detrimentally by reducing the basic strength of the hydroxide in the reaction mixture. For each mol of the salt, the reaction mixture should contain an amount of the hydroxide in the range from about 4 to 20 mols, preferably 6–14 mols.

The production of hydroquinone by the present process is surprising in view of the art. U.S. Pat. No. 2,439,237 discloses that the treatment of polyhalo-substituted phthalic acid with a base yields polyhalo-benzoic acid or polyhalobenzene. Apparently, in view of the present discovery, the geometric relationship of the carboxyl groups of a halo-substituted benzene dicarboxylate salt or acid drastically alters the course of and the products from displacements on aromatic carbon atoms. The products obtained from halo-substituted phthalates (ortho carboxyl relationship) are different from those obtained from halo-substituted terephthalates (para carboxyl relationship). The former yield halo-substituted benzoic acid and/or halo-substituted benzene, whereas the latter yield hydroquinone.

A further conflicting factor in the present displacement reactions on aromatic carbon atoms in addition to the aforementioned geometric effect is associated with the pH of the reaction medium. Apparently pH plays an important role in displacements on aromatic carbon atoms of functional groups. U.S. Pat. No. 3,413,341 discloses that in halogen displacements on poly-functional substituted aromatic compounds effected at a pH below 7, halogen is displaced by hydroxyl and, where present, carboxyl groups are retained. The production of hydroquinone as in the present process is consequently an unexpected, albeit very useful, result.

CHLORINATION AND OXIDATION OF PARAXYLENE

Hydroquinone is a well-known article of commerce. 2,5-dichloroterephthalic acid, on the other hand, while not of particular commercial importance, is readily prepared from paraxylene. Paraxylene is readily chlorinated in the presence of chlorine gas and $FeCl_3$ at temperatures from 0° to 80°C., preferably from 10° to 30°C. The chlorination reaction is also preferably carried out in the absence of light, in order to prevent chlorination of the alkyl group. The resulting dichloroparaxylenes are readily separated from the reaction mixture using wellknown distillation apparatus. The 2,5-dichloroparaxylene is then separated from other dichloro derivatives by well-known crystallization methods. See, for example, U.S. Pat. No. 3,035,103, which teaches the preparation of 2,5-dichloroparaxylene from paraxylene.

The 2,5-dichloroterephthalic acid is then prepared by conventional oxidation reactions, such as by the use of potassium permanganate, aqueous nitric acid, and the like oxidation agents. Dichloroparaxylene may also be oxidized to dichloroterephthalic acid by the well-known cobalt-catalyzed, liquid-phase air oxidation processes.

PREFERRED EMBODIMENT 2,5-Dichloroterephthalic acid, aqueous sodium hydroxide, and cuprous oxide are charged to a pressure autoclave fitted for mixing. The amounts of each component are proportioned to yield a reaction mixture having the relative molecular amounts of dichloroterephthalate salt, sodium hydroxide, water and copper catalyst of 1:13:13:0.16, respectively. The autoclave plus charge in the liquid phase are heated at a temperature of 200°–210°C. for about one hour. The resulting reaction mixture is then cooled and acidified by dissolving carbon dioxide gas in the mixture. The liberated hydroquinone is then removed by extraction with a suitable organic solvent, for example ethyl ether, and recovered by distillation.

The aqueous solution remaining after removal of the hydroquinone contains a minor amount of reaction intermediates, mainly monochlorohydroxybenzene carboxylates and sodium bicarbonate from the main reaction (2 mols of sodium bicarbonate for each mol of hydroquinone produced) and from excess sodium hydroxide. This solution is regenerated for recycle to the process by the addition of calcium oxide and filtration to remove the insoluble calcium carbonate formed in the regeneration stage as well as some of the sodium chloride, i.e., that amount in excess of solubility. After additions of the base and water to adjust for mechanical losses in the processing, the regenerated caustic medium is recycled to the process. The conversion of the feed is about 90–95 mol percent, and the yield is 95–98 mol percent.

THE REACTION EQUATIONS

The chemical conversions effected in the process of the invention may be summarized as follows:

1. $C_6H_2(CO_2Na)_2Cl_2 + 4NaOH \rightarrow p\text{-}C_6H_4(ONa)_2 + 2NaCl + 2NaHCO_3 + H_2O$ 2. $NaHCO_3 + NaOH \rightarrow Na_2CO_3 + H_2O$
3. $p\text{-}C_6H_4(ONa)_2 + 2CO_2 + 2H_2O \rightarrow p\text{-}C_6H_4(OH)_2 + 2NaHCO_3$
4. $Na_2CO_3 + CO_2 + H_2O \rightarrow 2NaHCO_3$
5. $NaHCO_3 + CaO \rightarrow NaOH + CaCO_{3(s)}\downarrow$

TEMPERATURE

The present process may be carried out over a range of temperatures with the usual reaction rate effect, i.e., the rate doubles for about each 10°C. incremental increase. At 150°C. there is an appreciable rate of hydroquinone production. In the range 240°–270°C., on the other hand, one or more side reactions are experienced in which hydroquinone is converted to undesirable by-product(s). Best results, in general, obtain at a temperature in the range 190°–210°C. after a period of about one hour. Satisfactory reaction temperatures in general are in the range above 150°C. and below 240°–270°C.

HYDROXIDE REACTANT

In order to effect the displacement of chloride and carboxyl (decarboxylation) groups herein, an exceptionally strong basic medium is required. The alkali metal hydroxides in general satisfy this need. In particular, sodium, potassium and lithium hydroxides and mixtures thereof are useful. For reasons of cost, sodium hydroxide is preferred.

For each mol of the dichloroterephthalate salt present in the reaction mixture (see equation 1 above), at least 4 mols of the alkali metal base is necessary for the satisfaction of the stoichiometric requirement. A substantial excess of the base should be present in order to reduce a polymer-producing side reaction to a satisfactory level. For this purpose, for each mol of salt feed at least 6 mols of base should be present. Best results, in general, obtain when the amount of the base is in the range 10–14 mols per mol of the dichloroterephthalate. Larger relative amounts, for example as much as 20 mols and more, may be employed.

ACIDIFICATION

Acids in general having an acid strength greater than hydroquinone are suitable for the liberation of hydroquinone from its alkali metal salt. Mineral acids are satisfactory because of the low cost. However, carbon dioxide (carbonic acid) is preferred as an acidifier because its use permits regeneration of the excess alkali metal hydroxide and an easy control of pH in the range 6–7 (see reaction equations above). This pH is sufficient to free hydroquinone but does not liberate minor amounts of unconverted carboxylate salt feed or intermediates which may be present in the acidified reaction product mixture.

WATER DILUENT

From an inspection of equation 1 above, water does not appear to be a reactant in the reaction system. However, in the absence of water the results are poor and the processing is difficult. Mixing and local overheating effects in particular are not good. At least about 0.5 mol of water per mol of hydroxide should be present in the mixture. An excess of water relative to the hydroxide, on the other hand, adversely affects the desired reaction. When the mol ratio of water to hydroxide exceeds about 1 to 1, the results become progressively poorer as the ratio becomes larger. From this fact, it is inferred that amounts of water substantially in excess of a 1:1 ratio reduces the basicity of the hydroxide reagent. Useful results are achieved when the water-to-hydroxide ratio is below about 9, but for satisfactory conversions of the dichloroterephthalate salt to hydroquinone this ratio should not exceed about 3–5; and, in general, for best results, for each mol of hydroxide in the reaction mixture the amount of water should be in the range 1 to 3 mols, preferably 1 mol, of water.

Along with water, if desired, methanol and ethanol may be added to the reaction system as diluents. However, because of the relatively lower boiling points of these alcohols, their presence in the system results in higher system pressures. Similarly, dimethylsulfoxide may also be used as a diluent (see, for example, U.S. Pat. No. 3,481,991) for the present displacement reaction, but such use complicates the hydroquinone recovery stage and hence is not a preferred mode.

REACTION PROMOTERS

Hydroquinone is produced by the process herein in the absence of catalysts. The presence in the reaction medium of a copper compound, however, is beneficial. Copper compounds, in general, which convert to oxide(s) of copper in the presence of strong alkali metal hydroxides are useful promoters for the reaction. Thus, representative promoters suitable for use herein include cuprous oxide, copper chlorides, carboxylates, nitrates, sulfates, acetates, and the like copper compounds.

Trace amounts of copper oxide are beneficial. Satisfactory amounts are in the range 0.01 to 0.25 mol per mol of the dichloroterephthalate salt. Larger relative amounts may be used, but cost becomes a factor. The preferred range is 0.05 to 0.2 mols of promoter (based upon copper) per mol of the dichloroterephthalate feed.

The following examples are for the further illustration of the invention.

EXAMPLES

EXAMPLE 1

Preparation of 2,5-Dichloroparaxylene

A 600-ml turbomixer equipped with a gas inlet tube, a stirrer, a thermometer, and having a water jacket, was charged with 530 g (5.0 mols) of paraxylene and 10.0 g of ferric chloride. The turbomixer was wrapped with aluminum foil, and chlorine gas diluted with nitrogen was bubbled through the stirred mixture, which was maintained at a temperature of 22°–26°C. for 220 minutes. Then the temperature was raised to 30°–48°C., and chlorine was added for an additional 236 minutes.

The reaction mixture was removed from the turbomixer and washed with 500 ml of 10 weight percent aqueous hydrochloric acid and with 1 liter of water. Chloroform was added, the solution was dried, and then the chloroform was removed by heating on a steam plate.

The crude product was charged to a Vigreux column and was distilled at 10 mm Hg pressure. The following fractions were taken:

TABLE I

| Fraction | Boiling Point, °C. | Weight, g | 2,5-Dichloroparaxylene, Mol %* |
|---|---|---|---|
| 1 | 45–66 | 3.2 | 41.4 |

TABLE I-Continued

| Fraction | Boiling Point, °C. | Weight, g | 2,5-Dichloropara-xylene, Mol %* |
|---|---|---|---|
| 2 | 66–90 | 32.8 | 50.4 |
| 3 | 90–98 | 208.6 | 65.5 |
| 4 | 98–104 | 256.9 | 67.5 |
| 5 | 104–104.5 | 87.7 | 61.6 |
| 6 | 104.5–106 | 34.8 | 55.9 |
| 7 | 106–116 | 91.1 | 47.8 |
| 8 | 116–126 | 120.1 | 2.8 |
| 9 | 126 | 13.0 | 0 |
| Residue & Holdup | | 8.9 | |
| Total | | 857.1 | |

*Determined by vapor phase chromatography.

Fractions 3, 4, 5, 6 and 7 were combined and redistilled at 20 mm Hg pressure. The following fractions were taken:

TABLE II

| Fraction | Boiling Point, °C. | Weight, g | 2,5-dichloropara-xylene, Mol % |
|---|---|---|---|
| 1 | 84–100 | 30.0 | 36.0 |
| 2 | 100–108 | 53.7 | 69.1 |
| 3 | 108 | 27.4 | 74.7 |
| 4 | 108 | 27.4 | 74.9 |
| 5 | 108–112 | 189.9 | 74.2 |
| 6 | 112–113 | 129.0 | 71.3 |
| 7 | 113–114 | 63.8 | 66.6 |
| 8 | 114–117 | 62.3 | 58.6 |
| 9 | 117–124 | 49.1 | 16.4 |
| Residue & Holdup | | 13.1 | |
| Total | | 645.7 | |

Fraction 4 of the above distillation, 24.5 g, was dissolved in 30 ml of hot isopropyl alcohol. Upon cooling to 0°C., white crystals precipitated and were recovered by filtration. After drying, 13.2 g of product having a melting point of 70.4°C. was obtained. A mixed melting point of this material with an authentic sample of 2,5-dichloroparaxylene was 70.4°C., indicating that the product was pure 2,5-dichloroparaxylene. A second crop of crystals, weighing 1.5 g, was recovered upon concentrating the solution.

EXAMPLE 2

Preparation of 2,5-Dichloroterephthalic Acid

A 250-ml turbomixer equipped with a stirrer, gas inlet tube, thermometer, a condenser leading to wet and dry ice traps, and an oxygen analyzer was charged with 17.5 g (0.1 mol) of pure 2,5-dichloroparaxylene, 100 ml of acetic acid containing 1.8 g (0.1 mol) of cobaltous acetate and 1.76 ml of methyl ethyl ketone. Air was bubbled through the resulting solution while it was stirred and heated to 100°C. over a period of one hour. At this time a drop in the oxygen content in the exit gas indicated that oxidation had begun. The mixture was maintained at a temperature in the range 110°–120°C. for 36 hours. During this time, a total of 50 ml of water was removed; and occasionally a few ml's of ketone were added. The reaction mixture was filtered while still hot to give 2.5 g. of 2,5-dichloroterephthalic acid.

EXAMPLE 3

Preparation of Hydroquinone

A small Monel metal microreactor was charged with 1.17 g (0.005 mol) of 2,5-dichloroterephthalic acid, 0.12 g of copper oxide, and 6.0 g of 50% aqueous sodium hydroxide. The reactor was sealed and placed in a shaker-heater apparatus. It was heated and shaken at 200°C. for one hour. Then 3 ml of water was added, and the reaction was continued as before for another hour.

After cooling, the reaction mixture was filtered. The filtrate was acidified with HCl and extracted with 100 ml and with 50 ml of ether. The combined extracts were extracted with an aqueous sodium bicarbonate solution, which upon acidification and ether extraction gave 0.41 g of unreacted 2,5-dichloroterephthalic acid.

The combined ether extracts, after drying, were analyzed by vapor phase chromatography and were found to contain 0.27 g of hydroquinone, a 75% yield based on 65% conversion of dichloroterephthalic acid.

The data in the above example clearly demonstrate that alkali metal salts of 2,5-dichloroterephthalic acid are effectively converted to hydroquinone by the novel process herein described.

It is to be understood that the invention is in no way limited by the specific examples given herein and that many modifications and variations may be made without departing from the spirit and scope of the inventive contribution as set forth in the following claims.

What is claimed is:

1. A method for the production of hydroquinone comprising:
   a. dichlorinating paraxylene in the liquid phase under reaction conditions effective to produce 2,5-dichloroparaxylene and recovering the 2,5-dichloroparaxylene;
   b. oxidizing the recovered 2,5-dichloroparaxylene under reaction conditions effective to produce the corresponding dichloroterephthalic acid isomeric mixture;
   c. reacting the acid with an alkali metal hydroxide by heating a mixture of the reactants in the liquid phase in the presence of water wherein the heating is above about 150°C. and below about 270°C., wherein for each mol of the resulting alkali metal salt of the acid the mixture contains an amount of the hydroxide in the range from about 4 to 20 mols, and wherein for each mol of the hydroxide the mixture contains an amount of water in the range from about 0.5 to below about 9 mols; and
   d. acidifying the resulting reaction product mixture by addition of carbon dioxide.

2. The method as in claim 1 further characterized in that the reaction of step (c) is promoted by copper oxide.

3. The process as in claim 1 further characterized in that hydroquinone is recovered from the resulting acidified aqueous reaction mixture by extraction with ether.

* * * * *